United States Patent [19]

Arbige et al.

[11] Patent Number: 4,927,644

[45] Date of Patent: May 22, 1990

[54] PREFERENTIAL ENTRAINMENT OF ENZYMES IN CHEESE CURDS

[75] Inventors: Michael V. Arbige, Montara; Scott C. Silver, Belmont, both of Calif.

[73] Assignee: Genencor, Inc., South San Francisco, Calif.

[21] Appl. No.: 67,664

[22] Filed: Jun. 25, 1987

Related U.S. Application Data

[63] Continuation-in-part of Ser. No. 689,867, Jan. 9, 1985, abandoned.

[51] Int. Cl.$^5$ ............... A23C 19/032; A23C 19/05
[52] U.S. Cl. ..................................... 426/35; 426/36; 426/40; 426/582
[58] Field of Search ............... 426/35, 36, 38, 40, 426/582, 42, 580, 583

[56] References Cited

U.S. PATENT DOCUMENTS

| | | | |
|---|---|---|---|
| 2,560,182 | 7/1951 | Nelson et al. | 426/35 |
| 3,156,568 | 11/1964 | Hargrove et al. | 426/35 |
| 4,636,468 | 1/1987 | Arbige et al. | 426/35 |

*Primary Examiner*—Marianne Cintins
*Attorney, Agent, or Firm*—James G. Passé; Brian D. Voyce

[57] ABSTRACT

The invention relates to a novel method for preferentially entraining a lipase or protease substantially into cheese curds when making curds and whey. An insoluble enzyme particle size of at least about 0.20 microns is selected or formed, and upon curd formation the insoluble particle will substantially be entrained therein, thus, leading to a substantial reduction in the amount of enzyme lost in the whey without the need to add additional complexing or immobilizing agents.

4 Claims, No Drawings

PREFERENTIAL ENTRAINMENT OF ENZYMES IN CHEESE CURDS

CROSS-REFERENCE TO RELATED APPLICATIONS

This application is a continuation-in-part of application Ser. No. 689,867 filed Jan. 9, 1985 (Docket GC22-US1), now abandoned.

TECHNICAL FIELD

The present invention relates to a novel process for preferential entraining microbial enzymes, such as proteases and lipases substantially into cheese curds. Proteases and lipases having a particle size equal to or greater than 0.20 microns are preferentially partitioned into the cheese curds.

BACKGROUND ART

Accelerated ripening of cheese to improve cost efficiency through reduction of storage time is important to the cheese industry. Techniques which are currently being evaluated include elevation of storage temperature, culture modifications, addition of enzymes such as proteases and lipases and combinations thereof. Accelerated ripening has limited commercial value due to inherent problems in controlling available techniques. For example, the use of elevated temperatures, often results in problems which include microbial spoilage and development of an imbalance flavor profile; i.e., one not representative of the variety of cheese in question.

Enzyme addition is one route that has been used to accelerate ripening because many cheese varieties in the past have been matured by the action of enzymes associated with milk microflora. However, a problem with enzyme additions is that soluble enzymes, such as lipases and proteases, added to milk before renneting are evenly distributed in both curds and whey. Because curds constitute only a small fraction of the milk volume, the majority of the added enzyme is lost to the much greater volume of whey produced during the cheese making process. Not only is there an uneconomical loss of enzyme, but the resulting whey may be of questionable quality due to excessive fat/protein breakdown from the excess enzyme which needs to be added to achieve adequate levels of enzyme in the curd.

Enzymes could be added directly to the curd before pressing by addition to the salt added during pressing or by spraying a liquid enzyme preparation onto the curds. However, post-renneting addition does not allow for the uniform incorporation of enzyme throughout the curd particles. Furthermore, these methods of distribution are exceedingly difficult to carry out at a factory scale unless special equipment and procedures are employed.

Another method is described in U.S. Pat. No. 4,013,511 Goldstein which discloses use of an immobilized enzyme to make cheese. The immobilization is done by way of an insoluble absorptive resin which is bound to a protease. The resin contributes substantial size to the enzyme (particle is described in the size range of 60–160 microns). Insolubility is achieved and taught in the art by selecting a carrier such as an immobilization agent which is already insoluble for binding to the enzyme. A particular problem with the immobilization agent/enzyme complex in use in food products such as cheese is the difficulty in adding materials that are not approved regulatorily for use in food. Another problem with this method is that the particle size is extremely large and may affect the texture of the curd and resulting cheese.

DESCRIPTION OF THE INVENTION

It is, therefore, an object of this invention to be able to incorporate lipases and proteases into milk for the purpose of making cheese such that substantially all of it is preferentially partitioned into the curds upon formation of curds and whey, and that this is accomplished without large particle size and without addition of anything to the curds other than the enzyme.

Accordingly, the present invention relates to a novel method for entraining proteases and lipases substantially into cheese curds, and subsequently eliminating passage of the enzyme to the whey. More particularly, proteases and lipases materials which alter the organoleptic development of the cheese curd or resulting cheese; e.g., proteolytic and lipolytic enzymes of a microbial origin, can be made to preferentially and substantially partition into cheese curds. Preferential partitioning of proteases and lipases in curds without a complexing or immobilizing agent has never been achieved before, although such process has been long sought, and, thus, the possibility of such a process is unexpected. Of course, such partitioning means less enzyme can be used in the cheese making process which is an important economic benefit. Even further, the partitioning is achieved without a particle size, which affects the texture of the cheese.

Particularly, the invention relates to a process of preferentially entraining a protease or lipase particles substantially into cheese curds comprising:

(a) selecting particles having a size of at least about 0.20 microns; said particles consisting essentially of a protease or lipase enzyme from a microbial source wherein said enzyme is suitable for entrainment in cheese;

(b) adding the selected protease or lipase to milk; and (c) forming curds and whey from the milk of step b.

In a preferred embodiment of the invention, the particle size of the enzyme is from about 0.20 microns to about 60 microns. In a more preferred embodiment, the particles are from about 0.20 microns to about 50 microns, and in a most preferred embodiment from about 0.20 microns to about 5 microns.

Once the curds are formed from the milk, the curds may then be separated and cheese made therefrom in a conventional manner.

Prior to Applicant's invention, all protease and lipase enzymes for entrainment in cheese were thought to be soluble in milk. Various complexing and immobilizing agents were used to create particles that were insoluble. It has been discovered, surprisingly, that the enzymes useful for entrainment in cheese when made consisting essentially of particles 0.20 microns or larger (something not done before), such particles consisting essentially of a lipase or protease become insoluble in milk, and, thus, preferentially entrained in the milk curds when making curds and whey therefrom using methods known in the art. This is accomplished without inclusion of any meaningful quantities of complexing or immobilizing agents. This, accordingly, solving a long-standing problem in the art of cheesemaking.

The enzymes selected for use in the invention can be any microbial enzyme, including recombinant microbial sources such as those with modified enzyme sequence structure, suitable for inclusion in cheese and having a particle size of at least about 0.20 microns. Enzymes having the proper size can be obtained any number of ways. For example, a 0.2 micron filter can be used to isolate the proper size enzyme particle. Also, production techniques, especially during recombinant production can be used. By selecting lipases which are bound to the membrane by production conditions such as described in U.S. Pat. No. 4,636,468, one can cause micelles of enzyme to form. Micelles are particles consisting essentially of aggregates of enzymes bound by hydrophobic or hydrophillic forces. One skilled in the art would know how to isolate and or produce a micelle particle of an enzyme at least 0.20 microns in size. Practically, it is preferred that the particle size be less than about 60 microns in order to not affect the texture of the resulting cheese.

DESCRIPTION OF PREFERRED EMBODIMENT

LIPASE PARTITIONING

Initial partitioning studies were conducted using lipases from both microbial and animal sources. The solubility of these lipases was determined by filtering a liquid enzyme mix through a 0.20 micron Millipore ® filter. The filtrate was measured for enzymatic activity, which is expressed in Table 1 as a percentage of the initial activity of the filtered mix.

TABLE 1

Solubility of Various Lipase Preparations

| SOURCE | % OF INITIAL ACTIVITY RECOVERED IN FILTRATE |
|---|---|
| *Aspergillus oryzae* (Genencor)* | 0 |
| *Aspergillus niger* sps. (Novo) | 100 |
| *Mucor* sps. (International) | 100 |
| *Candida cylindracea* (Sigma) | 100 |
| *Pseudomonas aeruginosa* (Genencor) | 100 |

*The Genencor microbial lipase is not commercially available at this writing, but has been disclosed in a U.S. Pat. 4,636,468, Ser. No. 623,931, filed June 25, 1984.

Table 1 shows clearly that known microbial lipases are soluble, and that only the Genencor microbial lipase which is greater than 0.20 microns in particle size is insoluble.

ASSAYING LIPASE ACTIVITY

For this disclosure, all lipolytic activity was measured in the following manner. If curds, rather than liquids were being used, weighed samples were first homogenized with tributyrin substrate. Potentiometric titration is performed so as to determine lipase forestomach units (LFUs). One LFU equals the activity that releases 1.5 mol of butyric acid per minutes, Food Chemical Codex 3rd, Ed., National Academic Press, 1981.

The titration substrate is prepared by dispersing an amount of sodium caseinate equivalent to 600 mg of casein, in 95 ml of water contained in a one-half pint freezer jar that fits the head of a suitable high-speed blender. This is mixed with 0.5 gm of hydroxylated lecithin. Finally, 5.0 ml of Tri-n-butyrin is added and mixed for 60 seconds at low speed. This substrate must be held to 33° C. and used within 4 hours. the sample is prepared by suspending or dissolving an accurately weighed amount of enzyme in water.

To measure, the titrator is filled with 0.05 N sodium hydroxide, and the instrument is calibrated following the manufacturer's instructions. The substrate is mixed for about 15 seconds with a magnetic stirrer, then 20.0 ml is pipetted into the reaction vessel of the titrator. One ml of the sample is added and equilibrated for 15 minutes. The rate at which the titrant was delivered during the titration, is determined and recorded as R in ml per min. The activity of the enzyme is calculated by the formula:

$$LFU/g = R \times 0.25 \times 10^3/(W \times 1.25),$$

wherein W is the weight, in g, of the enzyme preparation contained in the 1.0 ml of Sample taken for analysis.

Several of the enzymes from Table 1 were selected and further investigated for use in small scale cheese making to observe the relationship between solubility and the partitioning between curds and whey.

SMALL SCALE CHEESE MAKING

To make cheese on a small scale, calcium chloride was added (dihydrate 1.47 g/L) to homogenized/pasteurized milk to assist curd formation. The milk was warmed to 89° F. in a constant temperature bath and glucono-delta-lactone (2.3 g/L) added for PH control. Various lipases were added at equivalent activity levels based upon tributyrin activity to aliquots of the warmed milk. Fifteen minutes after addition of the glucono-delta-lactone, the milk was set with calf rennet (Chr. Hansen's rennet: 0.144 g/l and, after mixing, allowed to incubate undisturbed for approximately 25 minutes until curd of the desired body was formed. The curd was uniformly cut and returned to the bath. Incubation temperature was raised to 100° F. within 22 minutes and held for a further 38 minutes to facilitate whey expression. Whey was drained and filtered through filter paper. Curds and whey were assayed for lipase activity.

The data in Table 2 show that total enzyme recovery was typically high. Some losses compared to initial activities could be attributed to enzyme inactivation during the cheese making process while others were due to physical losses.

TABLE 2

Partitioning of Added Enzyme During Small Scale Cheese Making

| SOURCE | % ENZYME RECOVERED | % OF TOTAL IN CURD | % OF TOTAL IN WHEY |
|---|---|---|---|
| A. oryzae (Genencor) *1* | 91 | 94 | 6 |
| A. oryzae (Genencor) *2* | 90 | 89 | 11 |
| A. niger (Novo) | 98 | 16 | 84 |
| A. niger (Novo) *3* | 78 | 18 | 82 |
| Mucor sps. (International) | 75 | 0 | 100 |
| P. aeruginosa (Genencor) | 53 | 54 | 46 |
| P. aeruginosa (Genencor) *4* | 76 | 75 | 25 |

*1* Average of 2 runs
*2* Enzyme added at twice the concentration of the previous sample.
*3* Enzyme added at three times the concentration of the previous enzyme.
*4* Enzyme precipitated with zinc sulfate to form slowly soluble complex.

The correlation between solubility (Table 1) and the partitioning of enzyme into the curd fraction (Table 2)

was exceedingly high. The insoluble Genencor microbial lipase partitioned 94% into the curd. Doubling the amount of added enzyme had little effect on the partitioning. In contrast, the soluble lipase derived from *Aspergillus* (*A.*) *niger* partitioned 20% in the curd. Because the curds represented approximately 20% of the total weight of the milk, and as 20% of the initial activity was found in the curds, this indicates that the enzyme was evenly distributed between the curds and whey. Tripling the enzyme level had no effect on this partitioning phenomenon.

The soluble Mucor enzyme appeared to have no affinity for the curd as no enzyme could be detected in the curd fraction. However, the loss of approximately 25% of the initial enzyme addition suggests that the partitioning was similar to that for *A. niger* but the enzyme retained by the curd either had lost activity or was unmeasurable due to a masking phenomenon. The partitioning of the enzyme from *Pseudomonas* (*P.*) *aeruginosa* is most relevant to the enzyme complex concept. Only 53% of the initial activity of the soluble form was recoverable, with approximately half of the remaining activity measurable in each of the two fractions. when this same enzyme was complexed with a zinc salt, into a complex having a particle size equal to or greater than 0.20 microns, approximately 75% of the activity was concentrated in the curd.

BULK CHEESE MAKING

Bulk milk was obtained from the University of Kentucky dairy farm, transported to the dairy lab, batch pasteurized at 63° C. for 30 minutes, cooled to 2° C. and held in a refrigerated vat until the following day. then, the milk was heated to 31.1° C., transferred to 365 kg capacity vats and manufactured into Colby cheese following Wister's procedure (1977) using Chr.Hansen's CH60 culture. Freeze-dried culture was seeded into skim milk and serially transferred to 22 kg of whole milk to form a bulk starter that was held overnight at 21° C. Four kilograms (kg) of bulk starter was added to each vat containing 365 kg of milk.

Salt was preweighed at an amount equal to 2% of the curd weight and mixed thoroughly with 10.9 kg of curd which was then hooped, and pressed to yield 9 kg blocks of Colby cheese.

Duplicate blocks of cheese were prepared for each treatment and manufacturing period, with the experiment being replicated two times.

PARTITIONING OF ENZYMES DURING BULK CHEESE PRODUCTION

A comparison was made between the partitioning of soluble and insoluble enzymes during bulk cheese production. The aforementioned cheese making method was scaled to 7 kg of milk for enzymatic partitioning studies. Cheeses were evaluated organoleptically by conventional techniques such as acid degree value (ADV), free fatty acid (FFA) analysis, and non-protein nitrogen (NPN) analysis in order to determine optimum enzyme addition levels for production scale cheese manufacturing. This optimum was determined and found to correspond to an enzyme addition level of 1 TBU per Kg of cheese. This dose level was arbitrarily given the designation "1X". For experimental purposes, other doses were assigned values relative to this optimum dose (i.e. 10X, 100X, etc.). Similarly, a "1X" dose of protease was established and this corresponds to the addition of 0.5 mg Genencor Rhozyme P11 ® per kg cheese.

To assay protease activity, casein was iodinated with $I_{125}$ and diluted with unlabelled casein. Protease containing samples were incubated with this substrate under defined conditions, and the reactions terminated by the addition of trichloroacetic acid. Soluble radioactive counts were detected and measured in a gammacounter. A standard curve with dilutions of known activity was run for comparison. Genencor *A. oryzae* fungal lipase was added to the milk before renneting at 1X, 10X, and 100X concentrations. Analysis showed that the insoluble lipase did not partition into the whey in any detectable level and appeared to remain totally entrained in the curd. Insoluble Genencor Rhozyme P11 ® fungal protease, partioned evenly between the whey and the curd at all levels tested (1X, 10X, 100X, 1000X). Approximately 90 percent of the soluble protease ended up in the whey in all cases.

PARTITIONING OF EXOGENOUS NON-ENZYMATIC MATERIALS IN CHEESE MAKING

To determine if the partitioning of the Genencor insoluble microbial lipase was a specific interaction, or if the entrainment of particles equals to or greater than 0.20 microns was a general phenomenon that would occur with other nonenzymatic insoluble materials, additional soluble and insoluble materials were tested. For these tests, milk curds were formed by acidifying the milk as in conventional cottage cheese production.

Colored or visually distinctive samples were selected and pretreated by grinding, sonication, or other similar methods to obtain particles within a size range that would not settle in milk at excessively fast rates. The insoluble compounds having a particles size in milk greater than or equal to 0.20 microns, as well as soluble compounds (usually dyes), were added to milk and mixed to ensure uniform distribution. Curd formation was induced by acid addition and the whey drained through plastic mesh. The presence of the added compounds in the curds and whey was determined visually. Three exogenous material complexes were also tested. They were prepared as follows:

Dyed Milk Protein: Acid curds were stained with Coomassie blue and centrifuged. The curds were added to fresh milk and the mixture sonicated to homogeneity. Curds were again induced with acid and the partitioning observed.

Dyed Genencor Insoluble Lipase: Coomassie blue was complexed with Genencor insoluble lipase and centrifuged. The dyed protease was collected free from unbound dye and added to milk as previously described.

Dyed Genencor Protease: Rhozyme P11 ® was precipitated with trichloroacetic acid and dyed with Coomassie blue. The precipitate was centrifuged. the dyed protease was collected free from unbound dye and added to the milk as previously described.

TABLE 3

Partitioning of Soluble and Insoluble Material Between Curds and Whey

| COMPOUND | SOLUBLE | IN WHEY | IN CURD |
|---|---|---|---|
| Blue Dextran | + | + | + |
| Bromophenol Blue | + | + | + |
| Phenopthalein | + | + | + |
| Acridine Orange | + | + | + |
| Coomassie Blue | + | + | + |
| Starch Azure | − | − | + |

TABLE 3-continued

Partitioning of Soluble and Insoluble Material Between Curds and Whey

| COMPOUND | SOLUBLE | IN WHEY | IN CURD |
|---|---|---|---|
| Cellulose Azure | − | − | + |
| Amylose Azure | − | − | + |
| Celite 577 (filter aid) | − | − | + |
| Activated Carbon | − | − | + |
| Dyed Milk Protein Complex | − | − | + |
| Dyed Lipase Complex | − | − | + |
| Dyed Protease Complex | − | − | + |

+ = Visually Detectable

As shown in Table 3, the results backed the conclusion that particle size of exogenous material was a general phenomena that determined partitioning into curds and whey. All soluble materials were more or less evenly distributed between the curds and the whey. Even soluble Coomassie blue which has a high affinity for proteins in the curd fraction was still present in substantial concentration in the whey fraction. However, all insoluble material were undetectable in the whey, and, thus, were retained in the curd fractions.

Having described the invention with particular references to preferred form, it will be obvious to those skilled in the art to which the invention pertains, that, after understanding the invention, various changes and modifications may be made without departing from the spirit and scope of the invention, as defined by the appended claims.

What is claimed is:

1. A process for improving the amount of protease or lipase which is entrained into cheese curds from milk comprising:
   (a) selecting insoluble particles having a size of at least about 0.20 microns; said particles consisting essentially of a protease or lipase enzyme from a microbial source;
   (b) adding to milk an amount of the selected protease or lipase particles sufficient to achieve the desired entrainment of the particles in the cheese curds; and
   (c) forming curds and whey from the milk of step (b).

2. A process according to claim 1 wherein the particles are from about 0.20 microns to less than about 60 microns in size.

3. A process according to claim 1 which further comprises the steps of separating the curds from the curds and whey and making cheese therefrom.

4. A process according to claim 1 wherein the enzyme selected is an Aspergillus oryzae having a particle size of at least 0.20 microns.

* * * * *